May 20, 1930.  W. POLGAR  1,759,465
DEMOUNTABLE CONVEYING DEVICE
Filed July 13, 1929
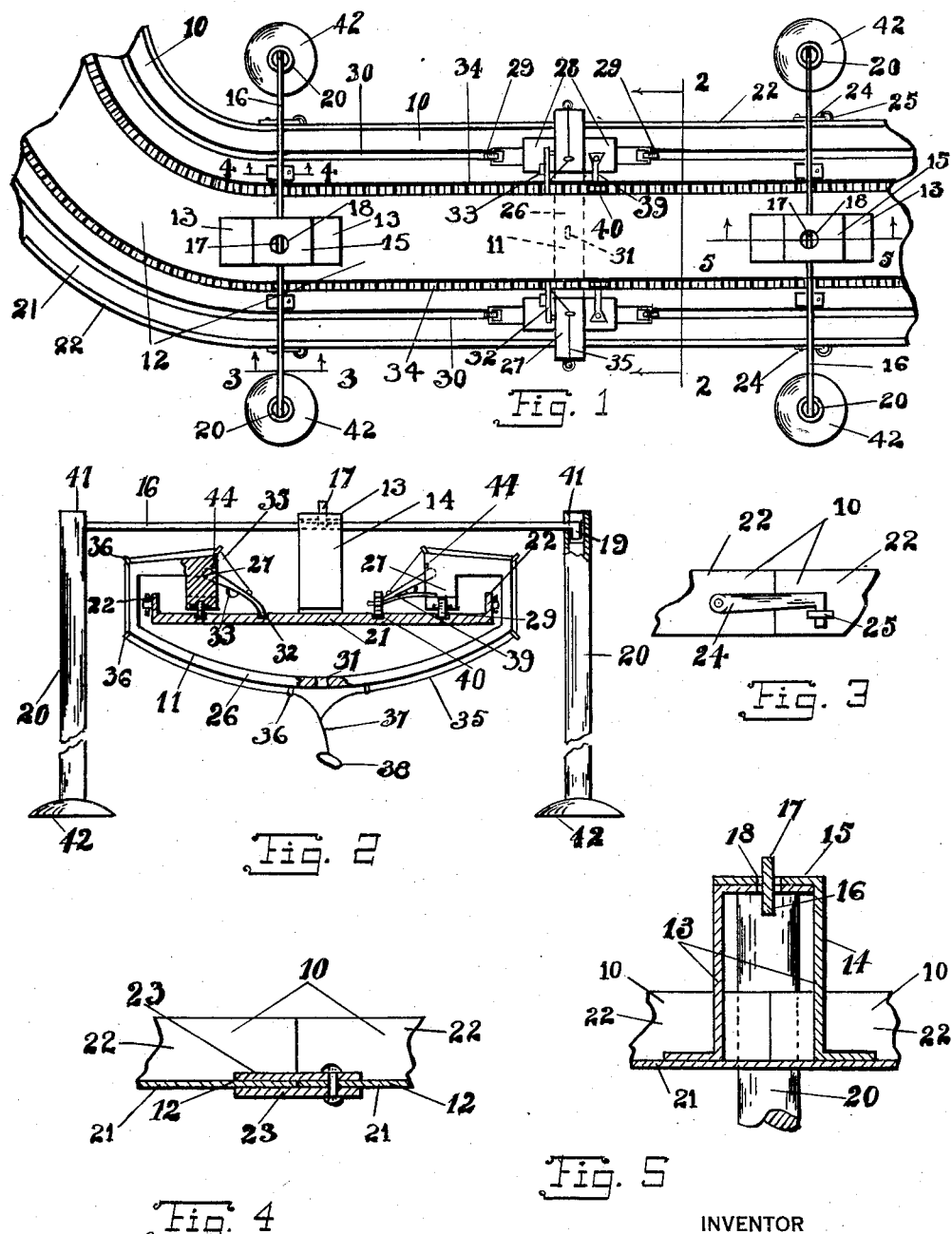
INVENTOR
William Polgar
BY
Edward Gottlieb
ATTORNEY Patented May 20, 1930

1,759,465

UNITED STATES PATENT OFFICE

WILLIAM POLGAR, OF NEW YORK, N. Y.

DEMOUNTABLE CONVEYING DEVICE

Application filed July 13, 1929. Serial No. 378,018.

This invention relates to new and useful improvements in a demountable conveying device.

During moving of families, and other moving jobs, it is customary for the moving men to carry the various articles upon their backs from the place of moving to the moving vehicle and upon reaching the new destination again carry the various articles from the moving vehicle to the new establishment. Very often houses from which and to which moving occurs lack elevators and very frequently the apartments are several flights up. This requires very hard work on the part of the moving men besides being a very tedious job.

The instant invention is calculated to reduce work in moving and to speed up the time in moving. Necessarily it will require a fewer number of men and the men may work shorter hours. This is a great saving, particularly when it is considered that when the moving vehicle travels from one place to another all the men remain idle during this travel and work only upon loading and unloading of the vehicle. Since a lesser number of men are required, the efficiency of moving will be materially increased.

The invention proposes particularly in setting a demountable conveying device along the halls, stairs, and rooms of the place in which moving it to occur so that the various articles may be conveyed to and from the moving vehicle. Obviously, the men need not work so hard as the carrying is done by the conveying device. They need only push it along to overcome friction. If power is available manual pushing is not necessary.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a fragmentary plan view of a demountable conveying device.

Fig. 2 is a fragmentary transverse sectional view taken on the line 2—2 of Fig. 1.

Fig. 3 is a fragmentary elevational view taken on the line 3—3 of Fig. 1.

Fig. 4 is a fragmentary sectional view taken on the line 4—4 of Fig. 1, and

Fig. 5 is a fragmentary sectional view taken on the line 5—5 of Fig. 1.

The demountable conveying device consists of a plurality of platform sections 10 adapted for connection in end-to-end relation, a carriage 11 movably mounted on said platform sections and adapted for receiving a hook connected for supporting furniture and the like, means for holding said carriage in stationary positions in place along the length of the platform sections, means for retarding the speed of motion of said carriage when not held, adjacent ends 12 of each of said sections 10 being provided with brackets 13 having vertical portions 14 and overlapping horizontal portions 15, a transverse beam 16 extending across the top of said platform sections between said vertical portions 13 and formed with a central pin 17 engaging through apertures 18 in said horizontal portions 15 and also formed with downturned ends 19, and columns 20 for receiving said downturned ends 19 for supporting the platform sections upon a flooring, stairway or the like.

Each of the platform sections 10 consists of a flat horizontal base 21 formed with integral vertical edges 22. One of the adjacent ends 12 of a pair of adjacent sections 10 is formed with overhanging strips 23 capable of straddling the other adjacent end, as clearly shown in Fig. 4, for holding the base portions of the platform sections in line. A hook 24 is pivotally mounted upon one of adjacent sections 10 and engages an eye member 25 upon the other of the adjacent sections for connecting the sections in a longitudinal line. As shown in Fig. 1, the platform sections may be straight, or curved so that they may be properly assembled along routes such as thru an apartment, along a hallway, down stairs, and to a moving van.

The carriage 11 consists of a yoke portion 26 and ends 27 extending over the edges of the platform sections. A horizontal plate 28 is attached upon each of the ends 27. Front and rear rollers 29 are mounted upon each of the horizontal plates 28 and engage in grooves 30 serving as tracks and extending the complete longitudinal length of the various platform sections. The grooves in the various platform sections are aligned with each other to make continuous paths. The yoke portion 26 is formed with an aperture 31 for receiving a hook connected for supporting bundles, furniture and the like.

The means for holding said carriage stationarily any place along the length of the platform sections consists of a pivotal catch 32 mounted upon each of the ends 27 and normally urged downward by an integral weight 33. The free end of each catch 32 is engageable in end-to-end relation of rack teeth 34 formed upon the platform sections in a longitudinal line. A cord 35 connects with the front end of the catch 32 and is guided through eye members 36 to the bottom of the yoke portion 26. At this portion the cords from the catches on the ends of the carriage 27 join into a single cord 37 and terminate in a sling 38 for manual gripping.

The means for retarding speed of motion of the said carriage 11 when not held, consists of an arm 39 projecting from each of the plates 28 and carrying a gear 40 engaging the ratchet teeth 34. This gear is frictionally mounted upon the arm so as to restrain free motion. The transverse beams 16 are of sufficient length so as to hold the posts 20 far enough apart to allow an unrestricted passage of the carriage along the complete length of the platform sections.

The columns 20 are formed at their top ends with slots 41 for receiving the transverse beams 16 and firmly holding them in place. A large base 42 is fixed upon the bottom of each of the columns for resting upon the ground and holding the columns vertically in a stable condition. Each of the columns are hollow, particularly at the tops for receiving the downturned ends 19. The bases 42 may rest upon any horizontal member such as stairs, even though different bases along the lines are at different elevations. The central pin 17 of each of the transverse beams 16 allow pivoting so that the platform sections may assume inclined positions.

When the moving job is to be done, the conveying device is assembled and then the various articles and bundles hooked upon the carriage 11 and thus guided from the place of moving to the moving vehicle. As shown on the drawing it is necessary for one of the men to manually draw downwardly upon the sling 38 for lifting each of the catches 32 of the carriage so that the latter element is free to move. Stop lugs 44 project from the carriage ends 27 and restrain complete lifting up of the catches 32.

The workman may now manually push the carriage along the platform sections. Unless suitable power is provided, and then this power may be used to draw the carriage along the route. When going downstairs, the means for retarding speed of motion of the carriage, namely the friction gear 40 is depended upon to restrain excessive speed of the carriage. Any time the moving man wishes to stop the carriage, he need only to release the sling 38 so that the catches 32 fall under the weights 33 into engagement with the rack teeth and accomplish the result. While two lines of rack teeth and two lines of tracks 30 have been illustrated, the device may readily be modified so as to employ only one line.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new, and desire to secure by United States Letters Patent is:—

1. A demountable conveying device, comprising platform sections adapted for connection in end-to-end relation, a carriage movably mounted on said platform sections and adapted for receiving a hook connected for supporting furniture and the like, means for holding said carriage stationarily any place along the length of the platform sections, means for retarding speed of motion of said carriage when not held, adjacent ends of each of the sections being provided with brackets having vertical portions and overlapping horizontal portions, a transverse beam over each joint between adjacent platform sections and between said vertical portions and formed with a center pin engaging through apertures in said horizontal portions and also formed with downturned ends, and columns receiving said downturned ends for supporting the platforms upon a floorway or stairway.

2. A demountable conveying device, comprising platform sections adapted for connection in end-to-end relation, a carriage movably mounted on said platform sections and adapted for receiving a hook connected for supporting furniture and the like, means for holding said carriage stationarily any place along the length of the platform sections, means for retarding speed of motion of said carriage when not held, adjacent ends of each of the sections being provided with brackets having vertical portions and overlapping horizontal portions, a transverse beam over each joint between adjacent platform sections and between said vertical portions and formed with a center pin engaging through apertures in said horizontal portions and also formed with downturned ends, and columns receiving said downturned ends for supporting the platforms upon a floorway or stairway, said means for holding said carriage stationarily any place along the length of the platform sections consisting of a catch pivotally mounted upon the carriage and urged into engagement with a line of rack teeth on the platform sections, a cord connected with the catch and guided along the carriage and terminating in a sling for manual drawing to lift the catch free from the rack teeth.

3. A demountable conveying device, comprising platform sections adapted for connection in end-to-end relation, a carriage movably mounted on said platform sections and adapted for receiving a hook connected for supporting furniture and the like, means for holding said carriage stationarily any place along the length of the platform sections, means for retarding speed of motion of said carriage when not held, adjacent ends of each of the sections being provided with brackets having vertical portions and overlapping horizontal portions, a transverse beam over each joint between adjacent platform sections and between said vertical portions and formed with a center pin engaging through apertures in said horizontal portions and also formed with downturned ends, and columns receiving said downturned ends for supporting the platforms upon a floorway or stairway, said means for retarding speed of motion of said carriage when not held comprising an arm projecting from the carriage and supporting a gear frictionally mounted, and said gear engaging in a line of rack teeth formed along said platform sections.

4. A demountable conveying device, comprising platform sections adapted for connection in end-to-end relation, a carriage movably mounted on said platform sections and adapted for receiving a hook connected for supporting furniture and the like, means for holding said carriage stationarily any place along the length of the platform sections, means for retarding speed of motion of said carriage when not held, adjacent ends of each of the sections being provided with brackets having vertical portions and overlapping horizontal portions, a transverse beam over each joint between adjacent platform sections and between said vertical portions and formed with a center pin engaging through apertures in said horizontal portions and also formed with downturned ends, and columns receiving said downturned ends for supporting the platforms upon a floorway or stairway and formed with top slots for receiving said transverse beams.

5. A demountable conveying device, comprising platform sections adapted for connection in end-to-end relation, a carriage movably mounted on said platform sections and adapted for receiving a hook connected for supporting furniture and the like, means for holding said carriage stationarily any place along the length of the platform sections, means for retarding speed of motion of said carriage when not held, adjacent ends of each of the sections being provided with brackets having vertical portions and overlapping horizontal portions, a transverse beam over each joint between adjacent platform sections and between said vertical portions and formed with a center pin engaging through apertures in said horizontal portions and also formed with downturned ends, and columns receiving said downturned ends for supporting the platforms upon a floorway or stairway, said carriage comprising a yoke beneath said platform sections and formed with ends extending over the edges of the platform and terminating in plates provided with rollers engaging grooves longitudinally arranged along said platform sections.

Signed at county of Bronx in the city of New York and State of New York this 12 day of July A. D. 1929.

WILLIAM POLGAR.